United States Patent [19]

Tippmer

[11] 4,235,625
[45] Nov. 25, 1980

[54] METHOD OF PRODUCING HYDROGEN AND CARBON-OXIDE-CONTAINING PROCESS GASES FOR USE FOR REDUCING ORES

[75] Inventor: Kurt Tippmer, Recklinghausen, Fed. Rep. of Germany

[73] Assignee: Firma Carl Still, Recklinghausen, Fed. Rep. of Germany

[21] Appl. No.: 931,256

[22] Filed: Aug. 4, 1978

[30] Foreign Application Priority Data

Aug. 4, 1977 [DE] Fed. Rep. of Germany ....... 2735090

[51] Int. Cl.³ ............................................. C22B 5/12
[52] U.S. Cl. ........................................ 75/91; 75/34; 48/202; 48/206; 252/373
[58] Field of Search ................... 252/373; 48/202, 206; 75/91, 34

[56] References Cited

U.S. PATENT DOCUMENTS

| | | | |
|---|---|---|---|
| 3,853,538 | 12/1974 | Nemeth | 75/35 |
| 4,031,030 | 6/1977 | Rudolph | 252/373 |
| 4,074,981 | 2/1978 | Slater | 252/373 |

Primary Examiner—M. J. Andrews

Attorney, Agent, or Firm—McGlew and Tuttle

[57] ABSTRACT

A method of producing hydrogen and carbon-oxide-containing gases for use for reducing ores and synthesizing hydrocarbons and oxygen-containing organic substances, comprises, directing a suspension of finely ground coal and oxygen through a burner into a pressure reactor to convert the coal into gases and partly burning the gases, separating the gases from non-converted coal and ash, directing the separated gases into a quenching water so that their heat content is converted into pressure steam and the gases are precooled. The precooled gases are further purified and further cooled. During quenching, the gases are cooled from temperatures in the range of from 1300° C. to 1500° C. down to 200° C. to 300° C., depending on the gasification pressure. The ash-free gases then become highly loaded with steam to a steam-to-gas ratio of 2 as they are cooled down to a temperature of from between 100° C. to 200° C., and to also form a condensate. The condensate is separated from the gases and recycled into the quenching process and the gases are further cooled to a temperature of from 4° C. to 80° C. and subsequently directed to the synthetic or ore-reducing process.

3 Claims, 1 Drawing Figure

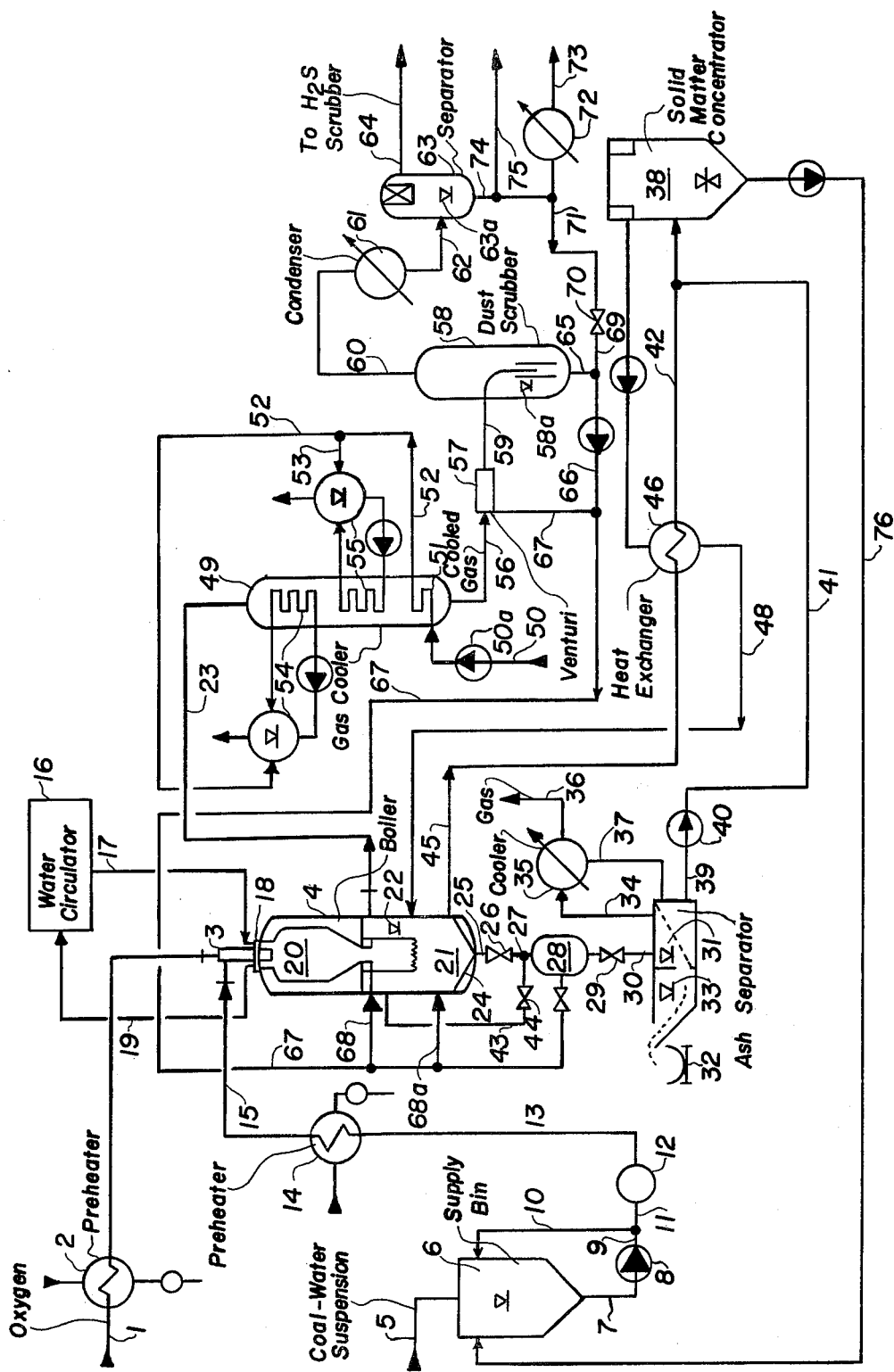

METHOD OF PRODUCING HYDROGEN AND CARBON-OXIDE-CONTAINING PROCESS GASES FOR USE FOR REDUCING ORES

FIELD AND BACKGROUND OF THE INVENTION

This invention relates to a method of producing hydrogen and carbon-oxide-containing process gases in general and, in particular, to a new and useful method of providing gases for reducing ores and synthesizing hydrocarbons and oxygen-containing organic substances, wherein, the gases are generated by directing a suspension of finely ground coal and water with oxygen into a burner for burning the coal to gases and for subsequently directing the gases into quenching water.

DESCRIPTION OF THE PRIOR ART

A method is known in which gas heat in excess is transferred to indirectly water-cooled radiation-heat absorbing surfaces of a radiant type waste heat boiler, and coal ash is collected in water and is removed, while pre-cooled impure gas still containing coal ash and non-converted coal is further cooled under steam generation to 250° C. to 300° C. in a convection-type waste-heat boiler and is then scrubbed and cooled again.

The reductive and catalytic processes in which the gases are to be used after their scrubbing and drying require pressures between 20 and 60 bar. Accordingly, taking pressure losses into account, the coal gasification is carried out in the pressure reactor under pressures of between 25 and 80 bar. In the pressure gasification of coal, a convenient possibility of feeding the solid fuel into a pressure reactor is to suspend it in a liquid. Water is suitable for this purpose since, in its presence, at high temperatures (1300° C. to 1500° C.), along with an almost complete conversion of the carbon of the coal, gases of a composition similar to that of water gas are obtained in this direct way, in a single-stage process. Such high temperatures in the coal conversion are also desirable because the ash particles become plastic and can agglomerate into larger, easily separable particles.

In the method of the prior art, difficulties arise from the fact that, for example, silicious ash components evaporate and condense on the radiation heat-absorbing surfaces, and thereby, form deposits such that the heat-absorption from the gas is reduced and the gases pass into the convection-type waste-heat boiler with an inadmissibly high temperature. The process gas, usually passing into the waste-heat boiler with a temperature of about 900° C., still contains large amounts of flue dust particles which may still be plastic or even liquid, and of non-converted coal, whereby deposits are formed in the piping of the waste-heat boiler narrowing or even clogging the passageways, and the cooling effect and steam generation or the gas flow may be reduced, so that the gas temperature becomes too high for the following gas scrubbing.

It has been proposed to improve the ash separation from the gas stream by quenching the hot gas from the pressure reactor in water. Thereby, not only are the flue dust particles and particles of non-converted coal separated, but, in addition, the gas is cooled and to a large extent loaded with steam, in accordance with the heat content of the gas. This effect is desirable for further processing and a gas is obtained having a steam-to-gas ratio of about 1.6.

The pre-purified process gas with a high steam content is supplied, for example, to a carbon oxide converting plant, and some of the steam content is converted prior to removing acid components, such as $H_2S$ and $CO_2$, in a scrubber.

In this modifiable method, the heat content of the gas is not utilized for recovering energy, for example, in the form of indirectly generated steam. Consequently, with the known or proposed methods, either process gases containing large amounts of flue dust are obtained and high pressure steam is generated during their production, or process gases largely free from flue dust and highly loaded with steam are obtained without the possibility of recovering steam indirectly.

SUMMARY OF THE INVENTION

The present invention is directed to a novel method uniting the advantages of the prior art, in which the gas leaving the pressure reactor is substantially free from flue dust and the heat content of the gas can be utilized for generating steam. The gas is therefore quenched in water, thereby cooling it, depending on the gasification pressure, from 1300° C. to 1500° C. to 200° C.–350° C., then the ash-free and highly steam-loaded gas is cooled in a waste-heat boiler down to a temperature of 100° C.–200° C. and a steam-to-gas ratio of 2, and steam is generated, having a pressure of 50 to 60 bar. The condensate is separated from the gas and recycled into the quenching process and the gas is scrubbed to separate it from the residual condensate and direct it to the synthesis or ore reduction, with a temperature of 40° C. to 80° C. and a pressure of from 20–60 bar. The degree of gas cooling depends on the use of the gas provided, and on the following scrubbing system.

It has hitherto been considered to be impossible to generate a satisfactory amount of steam economically in this way, in a manner which would be worth the expenses of the process. It has also been assumed that due to the pressure-temperature parameters of the condensation, only steam with a pressure below the gasification pressure can be generated. Experience has shown, however, that definitely paying amounts of steam can be produced having a pressure attaining or even exceeding the gasification pressure.

The amount of steam produced in accordance with the invention is larger than that obtained with the methods of the prior art in which there is a transferring and utilizing of the gas heat both by radiation and conduction.

The pressure in the water circuit of the waste-heat boiler may be controlled to exceed the pressure of the gas. In such a case, valuable heating steam for the scrubbers downstream of the steam-generating system can be obtained after releasing the pressure of the hot water. The pressure of the heat-absorbing part of the system may then exceed the pressure of the gas comprising part. In accordance with the invention, however, it is also possible to produce steam having a pressure lower than the gas and use it directly in the plat at suitable locations. In this variation of the method, the steam condensate remains within the gas-producing system.

Accordingly, it is an object of the invention to provide an iron ore reduction process gas which is produced from coal and water suspension which are partly burned with oxygen to generate gases which are directed into heat exchange with a wash water so as to cool the gases down to around 200° C. and to augment the steam therein in order to obtain a high steam content gas with a steam-to-gas ratio of approximately 2, and to subsequently remove unconverted coal and ash from the circulated wash water and wherein the heat used in the process is employed to preheat the wash water and the condensate is recirculated.

A further object of the invention is to provide a method of providing a process gas which is simple to carry out, requires inexpensive equipment and is very economical in execution.

For an understanding of the principles of the invention, reference is made to the following description of a typical embodiment thereof as illustrated in the accompanying drawing.

BRIEF DESCRIPTION OF THE DRAWING

The only FIGURE of the drawing is a schematic diagram of a process for manufacturing iron ore reduction process gas in accordance with the invention.

DESCRIPTION OF THE PREFERRED EMBODIMENT

Referring to the drawing in particular, the invention embodied therein, comprises apparatus for carrying out the method of producing an iron ore reduction process gas. Pure oxygen (99.5% by volume) is supplied through a line 1 and through a preheater 2 to the burner 3 of a gasification reactor 4. A supply bin 6 receives a coal-water suspension through a line 5. The suspension is moved by means of a pump 8 in a circuit formed by lines 7, 9 and 10. A part of the circulated suspension is directed through line 11 to a pump 12 and is fed through a line 13, a preheater 14 and line 15 to the burner 3. Burner 3 has its own cooling system which comprises a circulating means 16, a suply line 17, a burner cooling tube system 18 and a return line 19. The flame burns in the reaction space 20 and the combustion gases are caused to penetrate below the water surface 22 in a direct water cooler 21 and they escape through a line 23, while the ash particles and particles of non-converted coal are directed by baffles 24 into the lower part of direct cooler 21, wherefrom they are conveyed by a water stream through a line 25, valve 26 and line 27, to an intermediate tank 28 discharging the solid-water mixture through a valve 29 and a line 30 to an ash separator 31 and are then removed and transported away by vehicles 32. The liquid surface in the ash separator 31 is indicated at 33.

Ash separator 31 is provided with a gas and steam separating system comprising a line 34, cooler 35, gas evacuation line 36 and a condensate return line 37. An aqueous suspension still containing residual coal is directed through a line 39, pump 40 and lines 41 and 42, to a solid matter concentrator 38. In addition, a return line 43 with a valve 44 is provided to equalize the pressure in direct cooler 21.

A line 45 is further provided through which the coal ash water suspension is conveyed, with a cooling in a heat exchanger 46 and line 42, from direct cooler 21 to concentrator 38. Water freed from solid matter is supplied from concentrator 38 through a line 47 to the heat exchanger 46 where it is heated up and recycled through a line 48 to direct cooler 21.

The gas escaping from reactor 4 through line 23 is first directed into an indirect gas cooler 49. Cooler 49 comprises one or more high-pressure steam parts and a low-pressure steam part which are supplied with boiler feed water by a pump 50a through a line 50.

The feed water is preheated in part 51 of gas cooler 49 and flows from there through a line 52 to the high-pressure part 54 and through line 53 to the low-pressure part 55. The high-pressure steam can be used anywhere, including in the process itself. The low-pressure steam is used, for example, in gas scrubbers (not shown) for regenerating the wash solutions. The cooled gases pass from cooler 49 through a line 56 to a Venturi washer 57 where the gas is mixed with the circulated condensate of a dust scrubber 58 and passes through a line 59 into this dust scrubber 58 having a water level 58a. The dust-free gas is conveyed through a line 60 into a condenser 61 and from there through a line 62 into a separator 63 where the liquid level is indicated at 63a.

The gas, which is now cooled and free of water, is then supplied through a line 64 to the hydrogen sulfide scrubber prior to being used in a synthetic process. The wash water is drained through a line 65 at the bottom of dust scrubber 58, and a first part thereof is supplied through lines 66, 67, 68 and 68a to the direct gas cooler 21. A second part of the wash water passes through lines 65, 66 and 67 to the Venturi washer 57. The condensate from separator 63 returns through a line 71, valve 70, line 69 and the line 65 into the scrubber circuit. Condensate in excess from separator 63 may be drawn off to the waste water through lines 74 and 71, cooler 72 and line 73. However, it may also be reused in the coal preparation or for the coal-water suspension (line 5). The thickened residual coal-water suspension is returned from the solid matter concentrator 38 to the suspension supply bin 6 through a line 76.

EXAMPLE

In a plant for directly reducing iron ore and having a daily production of 1000 metric tons of iron, process gas is produced in an amount per hour containing 40,000 $Nm^3$ of carbon oxide and hydrogen. This amount of gas is produced from a coal-water suspension, by means of pure oxygen (99.5% by volume) and under a pressure of 28 bar. The respective suspension amount is 37,700 kg and its clean coal content is 20,500 kg while the percentage by weight of solid matter in the suspension is 58.5. The amount of clean coal comprises 19,500 kg of fresh clean coal, and 1,000 kg of coal which has not been converted during the partial oxidation and was separated from the gas stream, and is recycled into the process. The oxygen consumption per hour is 15,400 $Nm^3$. The reaction is conducted at about 1450° C. and 47,000 $Nm^3$ per hour of dry gas are obtained.

The gas produced contains 15,400 $Nm^3$ of steam and an ash amount of 1,500 kg, of which 1,000 kg originate in the fresh coal and 500 kg in the recycled coal proportion. Aside therefrom, 1,000 kg of non-converted clean coal are still present in the hot gas stream. The gas stream is cooled and washed by circulating water having a temperature of 192° C., whereby, the gas is cooled down to 202° C. and its steam content is augmented to 54,500 $Nm^3$. A gas with a high steam content is thus obtained with the steam-to-gas ratio of 1.8 $Nm^3/Nm^3$.

The content in solid matter, i.e., coal and ash, is removed by hot wash water (202° C.) and is carried out of the gasification system. Some of the ash particles separate from the wash water in the gasification system due to their grain size, and may be removed through a lock system. In practice, this proportion corresponds to the ash amount from the used fresh coal.

In a separator system outside of the gasification system, coal and water from the wash water stream, which is cooled to 90° C. in counter-current by the purified wash water, are now separated and returned to the charge bin for the suspension.

The gas with a high steam content, free from solid matter, is cooled down to 148° C. in an indirect gas cooler generating steam. The gas flows through the gas cooler from above downwardly and the condensate formed is conveyed in a parallel flow with the gas. The heat of condensation is removed, for example, in three zones. In the first zone, 30,000 kg of steam per hour having a pressure of 10 bar are produced, and in the second zone, 20,000 kg with a pressure of 4 bar. The low-pressure steam is used in the following scrubbers. The residual heat, as well as that of the third zone, serves the purpose of preheating 58,000 kg of boiler feed water from 105° C. to 142° C., for the first and second zones.

During the gas cooling to 148° C., 61,000 kg of condensate are formed which amount is separated from the gas stream in a separator and recycled into the quenching zone of the reactor for cooling the gas.

The first and second gas generating zones of the gas cooler operate on the forced circulation principle with a circulating pump, the differential pressure of the pump depending on whether the water pressure on the heat-removing side is to be above or below the gas pressure. Due to the parallel conveyance of gas and condensate in the indirect cooler, the pipes of the cooler are continually scavenged and an accumulation therein of solid matter particles still carried by the gas is prevented.

Compared thereto, if the prior art gas cooling system with a radiating part and a convection part would be applied to produce steam with a pressure above the gas pressure, only 48,000 kg of steam per hour could be generated, while, in accordance with the invention, 58,000 kg are obtained. That is, in the prior art system, a further cooling and ulitization of the gas heat are not possible in practice because of the solid matter content and the condensate formation.

While a specific embodiment of the invention has been shown and described in detail to illustrate the application of the principles of the invention, it will be understood that the invention may be embodied otherwise without departing from such principles.

I claim:

1. A method of producing hydrogen and carbon-oxide containing process gases, to be used for reducing ores and synthesizing hydrocarbons and oxygen containing organic substances, comprising the steps of fine grinding coal, suspending the coal in water, supplying the suspension and oxygen through a burner into a pressure gasification reactor, partly burning the aqueous solution in the reactor under excess pressure to produce gases in a temperature range of 1300° C. to 1500° C., ash and non-converted coal, separating the gases from the ash and non-converted coal, directing the separated gases into a quenching water within said reactor to form steam and to precool the gases to a temperature range of 200° C. to 350° C., depending on the gasification pressure, cooling the ash free steam and the gases in a waste-heat boiler having an indirect cooling water circuit to a temperature range of 100° C. to 200° C. to generate a steam pressure of 50 to 60 bar and a steam-to-gas ratio of about 2, condensing the steam to form a condensate and to further cool the gases to a temperature of from 40° C. to 80° C. at a pressure of from 20 to 60 bar, separating the condensate from the gases and recycling it into the quenching water, and directing the further cooled gases to the synthetic or ore-reducing process.

2. The method, as claimed in claim 1, wherein the step of cooling the ash-free steam and the gases in the waste-heat boiler includes directing a cooling water in three separate zone circulating systems through the boiler and cooling the steam by passing it over the separate zones to form a condensate, and using the heat received by the cooling water in one of the zones to preheat the cooling water of another zone.

3. A method as claimed in claim 1, including controlling the pressure in the water circuit of the waste-heat boiler by the pressure of the gas.

* * * * *